J. M. WHITE.
Attaching Hubs to Axles.
No. 16,891. Patented Mar. 24, 1857.
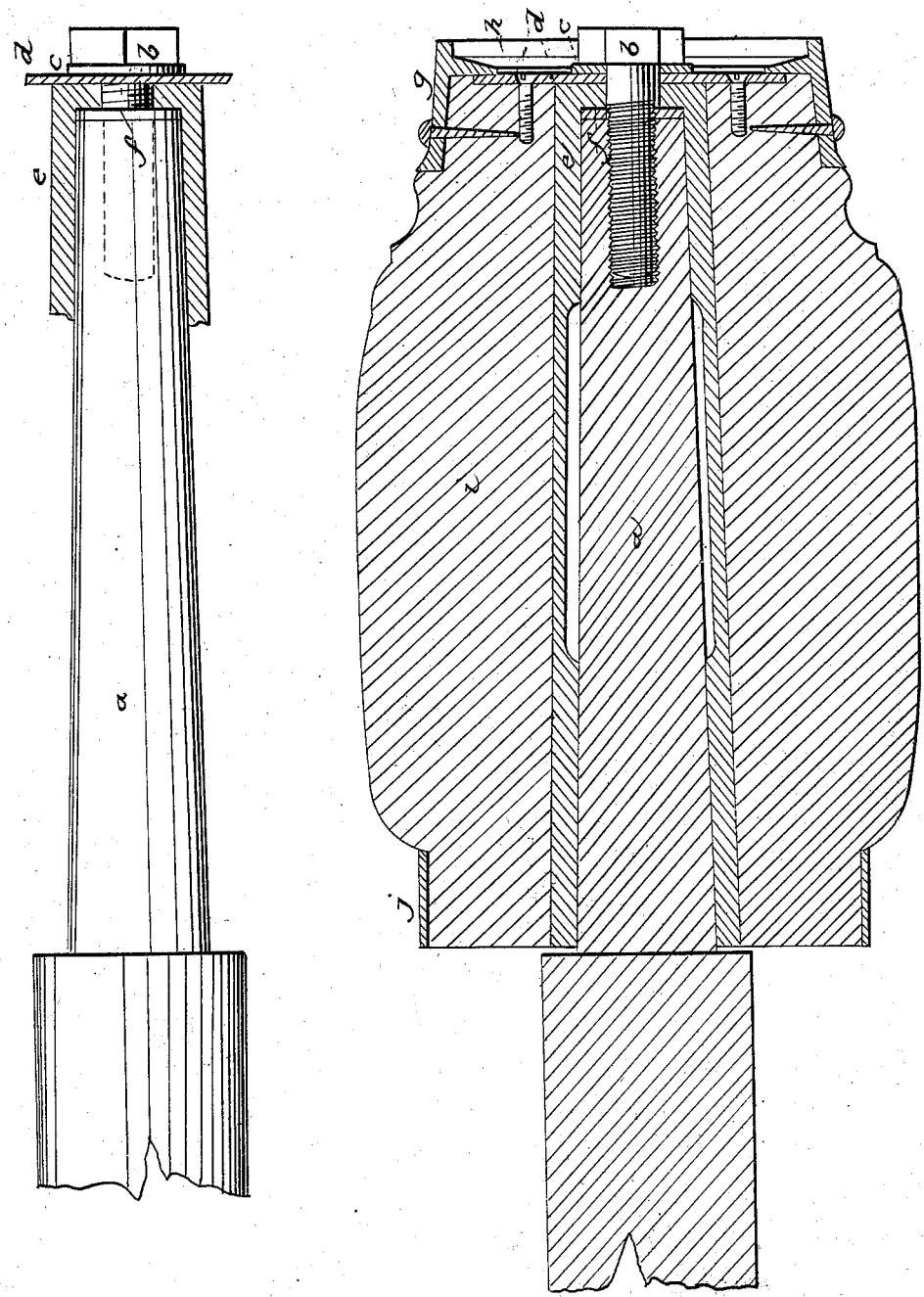

UNITED STATES PATENT OFFICE.

JAMES M. WHITE, OF XENIA, OHIO.

IMPROVED MODE OF ATTACHING HUBS TO AXLES.

Specification forming part of Letters Patent No. 16,891, dated March 24, 1857.

*To all whom it may concern:*

Be it known that I, JAMES M. WHITE, of Xenia, Ohio, have invented a new and useful Improvement in Attaching Hubs to Axles; and I do hereby declare the following to be a full, clear, and exact description of the same, reference being had to the annexed drawings, made part of this specification, and lettered to correspond therewith.

Figure 1 represents the axle broken off near the spindle and the end of the spindle with a portion of the pipe-box in section, and also of the detachable face-plate of the hub in section, a washer being represented between the end of the spindle and the pipe-box, and another washer between the face-plate of the hub and the head of the bolt screwed into a hole tapped in the end of the spindle of the axle. Fig. 2 represents a like proportion of the axle as in Fig. 1, with the hub, hub-bands, face-plate, pipe-box, and washers in vertical and central section, the screw-bolt being represented in view, and the figures seen as if looking at them from the back of the carriage or cart.

The nature of my invention consists in a new device for attaching hubs to axles, first, with a view to a secure attachment; second, with a view to being easily detached; third, with a view to running freely and easily; fourth, with a view to prevent the pipe-box being jerked out of the hub as the wheel vibrates in toward and out from the cart or carriage body; fifth, with a view to prevent the back of the hub cutting against and on the shoulder of the axle, and, sixth, with a view to being easily repaired.

Like letters refer to similar parts in both figures.

$a$ is the axle-spindle.

$b$ is the bolt, which screws into a hole tapped into the end of the spindle and passed thereinto through the external washer $c$, the face-plate $d$ of the hub, the pipe-box $e$, and the internal washer $f$. The screw-bolt $b$ has a stout head about twice the diameter and as thick as its stem. The external washer $c$ is of the same diameter as the head of the bolt, and takes the wear off the face-plate $d$ and bolt-head when the wheel vibrates from the carriage or cart body. The blow due to each vibration is received on the face-plate $d$, and this plate, being less in diameter than the front end of the hub, is set in even therewith, screwed onto the hub and held thereto, besides its own fastening, by the band $g$, by means of its internal flange $h$, so that the fastenings of the face-plate being axial and the fastenings of the band being radial to the hub there is every necessary security for keeping the hub on its pipe-box. When the wheel vibrates toward the carriage-body, the internal washer $f$ takes the wear off the pipe-box and end of the spindle, and, besides this duty, performs another very essential one—viz., prevents the hub running against the shoulder of the axle and being cut and destroyed thereby. As the wheel runs, it has a tendency to keep the screw tight in the axle, and the occasional backing of the cart or carriage not only has its tendency to unscrew the bolt in a great measure prevented by the washers, but the bolt is screwed into the spindle of the axle to an extent almost to forbid detaching the screw from the axle by backing the carriage.

The wooden body of the hub $i$ is of the usual form and size, and has a band $j$ on its inner or back end.

The wear and tear of the device will fall mainly on the washers $c$ and $f$. These can readily be renewed. The use of a detachable face-plate, such as $d$, enables me to use an external washer no larger in diameter than the head of the bolt $d$, and this saves friction and lets the wheel run easy.

Having thus fully described my improvement in attaching hubs to axles, what I claim therein as new, and desire to secure by Letters Patent of the United States, is—

My device, consisting of the combination of the parts marked $a\ b\ c\ d\ e\ f\ g\ h\ i$, arranged as described, and for the purposes set forth.

JAMES M. WHITE.

Attest:
THOS. G. CLINTON,
THOMAS C. DONN.